June 13, 1961   W. D. ALLISON   2,988,371
WHEEL SUSPENSIONS

Filed July 30, 1958   3 Sheets-Sheet 1

INVENTOR.
WILLIAM D. ALLISON
BY Hudson, Boughton,
Williams, David & Hoffman
ATTORNEYS June 13, 1961 W. D. ALLISON 2,988,371
WHEEL SUSPENSIONS
Filed July 30, 1958 3 Sheets-Sheet 2

INVENTOR.
WILLIAM D. ALLISON
BY
ATTORNEYS

FIG. 12 — NORMAL POSITION

FIG. 13 — WHEEL UP

FIG. 14 — WHEEL DOWN

INVENTOR.
WILLIAM D. ALLISON
ATTORNEYS

United States Patent Office 2,988,371
Patented June 13, 1961

2,988,371
WHEEL SUSPENSIONS
William D. Allison, Grosse Point Farms, Mich., assignor to Eaton Manufacturing Company, Cleveland, Ohio, a corporation of Ohio
Filed July 30, 1958, Ser. No. 752,052
8 Claims. (Cl. 280—96.2)

This invention relates to wheel suspension mechanisms for motor vehicles and, as one of its objects, aims to provide a novel form of torsion spring type of wheel suspension mechanism.

Another object is to provide a torsion spring type of wheel suspension mechanism which is simple and practical in form and which will be quiet and reliable in operation.

A further object is to provide a novel wheel suspension having arm means comprising a plurality of suspension arms and wherein a flat torsion spring swingably connects the inner end of at least one of the arms with the vehicle frame.

Still another object is to provide a wheel suspension mechanism of the kind above referred to and wherein the torsion spring extends along the frame and has its opposite end portions anchored thereon, and wherein the suspension arm associated with the torsion spring has its inner end secured to the intermediate portion of the spring.

This invention further provides a novel wheel suspension having upper and lower suspension arms and wherein a flat torsion spring swingably connects the upper arm with the frame in a manner to eliminate the need for separate pivot means for such upper arm, while retaining a desired geometry for the wheel in vertical motion, and in a manner to limit the flexibility of the mounting of the upper arm for noise reduction, the torsion spring preferably having a preformed twist therein and preferably being disposed in a tilted relation.

Additionally, this invention provides such a torsion spring type of wheel suspension mechanism having check and shock absorber means embodied therein in a novel manner for improving the functional characteristics and safety factor of the mechanism.

Other objects and advantages of this invention will be apparent in the following detailed description and in the accompanying drawings forming a part of this specification and in which, FIG. 1 is a partial plan view showing a vehicle wheel suspension mechanism embodying the present invention;

FIGS. 12, 13 and 14 are diagrammatic views showing different operating conditions of the wheel suspension, FIG. 12 showing the vehicle wheel in normal running position, FIG. 13 showing a wheel-up condition of the suspension and FIG. 14 showing a wheel-down condition of the suspension.

Figure 2:
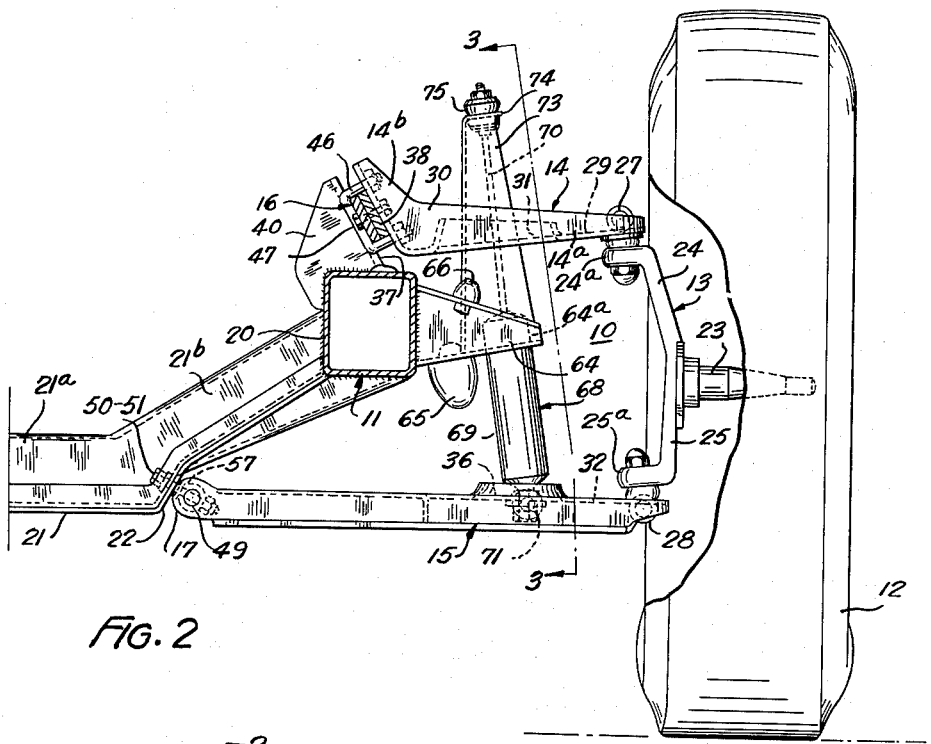
FIG. 2 is mainly an elevation of the suspension mechanism when viewed as indicated by the directional line 2—2 of FIG. 1 but with a portion of the mechanism shown in section.
Figure 1:
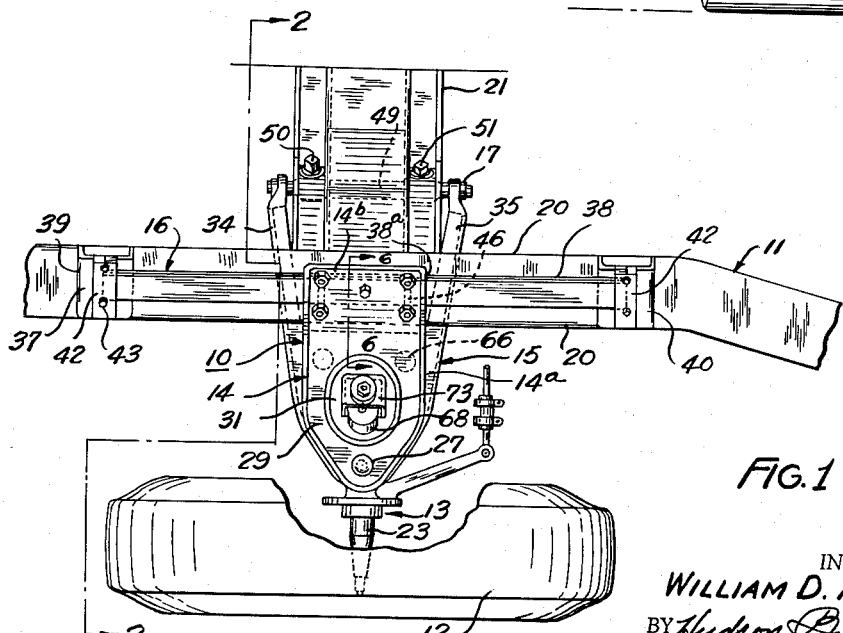
Figure 5:
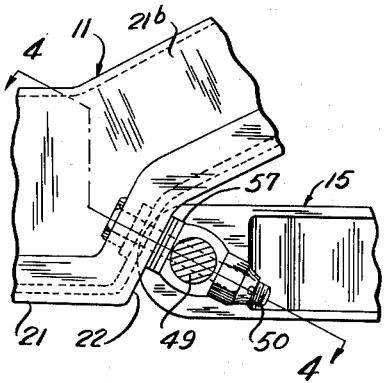
FIG. 5 is a fragmentary section taken on section line 5—5 of FIG. 4.
Figure 3:
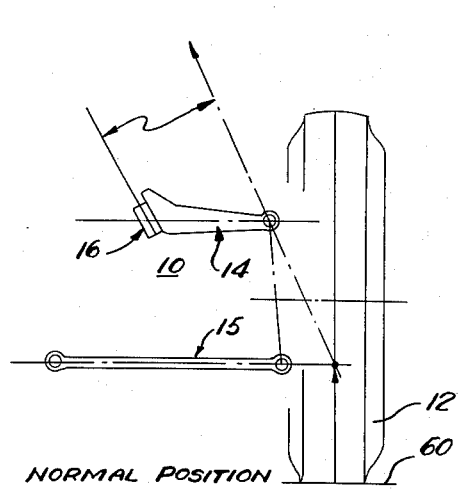
FIG. 3 is a vertical section taken through the mechanism as indicated by section line 3—3 of FIG. 2.
Figure 3:
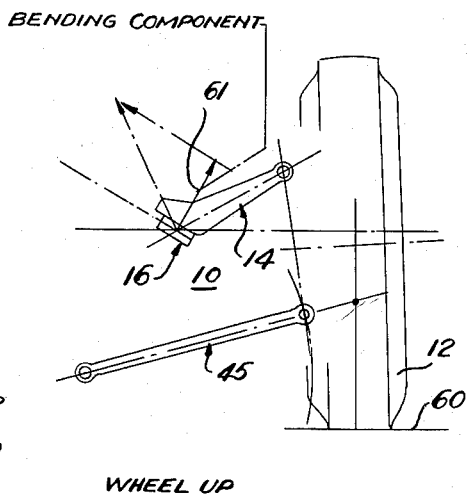
Figure 3:
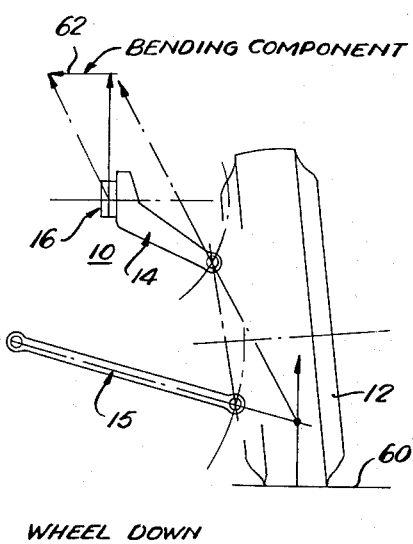
Figure 3:
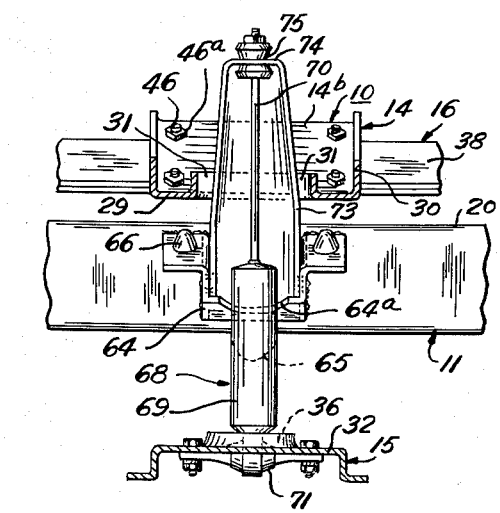

As one practical embodiment of the present invention, FIGS. 1, 2 and 3 show the novel wheel suspension mechanism 10 applied to a vehicle having a frame structure 11, or the equivalent thereof, and a plurality of road wheels of which only the wheel 12 is shown in the drawings and is represented as being a steerable front wheel of the vehicle.

The wheel suspension 10 comprises, in general, a wheel support member or steering knuckle 13 having the wheel 12 rotatably mounted thereon, and suspension arm means comprising a plurality of suspension arms or links, in this case, a pair of spaced upper and lower suspension arms 14 and 15 connecting the support member 13 with the frame structure 11. The suspension 10 also includes flexible connecting means for connecting the arm means with the frame and comprising torsion spring means 16 associated with the upper arm 14 and a connection 17 associated with the lower arm 15.

The frame 11 can be a part of a vehicle chassis or an integral part of a vehicle body and is here shown as comprising a longitudinal beam or side rail member 20 and a transverse frame member 21. The transverse member 21 comprises a horizontal portion 21$^a$ and has the adjacent end portion 21$^b$ thereof inclined upwardly toward the side member 20 and welded or otherwise suitably attached to the latter. At the junction of the horizontal and inclined portions 21$^a$ and 21$^b$, a laterally facing flat-plate securing portion 22 is provided for a purpose which will appear hereinafter.

The wheel support member 13 is of a conventional form having a spindle 23 on which the road wheel 12 is rotatbaly mounted. The member 13 also comprises upper and lower yoke arms 24 and 25 carrying eye portions 24$^a$ and 25$^a$ for use in connecting these yoke arms with the upper and lower suspension arms 14 and 15.

The suspension arms 14 and 15 extend in a transverse direction of the vehicle and project laterally from the frame member 20 so as to extend toward the wheel 12. The arms 14 and 15 have their outer ends connected with the eye portions 24$^a$ and 25$^a$ of the yoke arms by connections 27 and 28 of a conventional form. The connections 27 and 28 are here shown as being ball and socket type of connections which provide for both rocking and pivotal movements between the wheel support member 13 and the suspension arms 14 and 15.

The upper suspension arm 14 is here shown as being a lever arm or lever member comprising a straight arm portion 14$^a$ and an angularly disposed arm portion or foot 14$^b$ at the inner end of the straight arm portion and rigid therewith. The suspension arm 14 can also be referred to as a substantially L-shaped arm or lever member of which the straight arm portion 14$^a$ comprises the stem and the rigid angular arm portion 14$^b$ comprises the base. This upper suspension arm is here shown as being of a stamped or sheet metal construction having a web portion 29 and edge flanges 30 extending along the edges of such web portion. For a purpose to be explained hereinafter, the web portion of the straight arm portion 14$^a$ is provided with a clearance opening 31 at an intermediate point thereof.

The lower suspension arm 15 is here shown as being a stamped or sheet metal member in the form of a substantially straight lever having a flat web portion 32 adjacent the outer end thereof and a fork shape at the inner end thereof comprising spaced fork arms 34 and 35. For a purpose to be explained hereinafter, the web portion 32 is provided with an opening 36. The fork arms 34 and 35 are pivotally connected with the transverse frame member 21 by the pivotal connection 17 for vertical swinging of the lower arm 15 relative to the frame structure 11.

In accordance with the present invention, the upper suspension arm 14 is flexibly and swingably connected with the frame member 20 by means of the torsion spring 16 and the construction and arrangement of this torsion spring will now be described. The torsion spring 16 is an elongated flat spring comprising one or more spring leaves or blades 38 and extends longitudinally of the vehicle and along the frame member 20. In this case the torsion spring 16 is shown as comprising two of the longitudinally extending flat blades 38.

Figure 8:
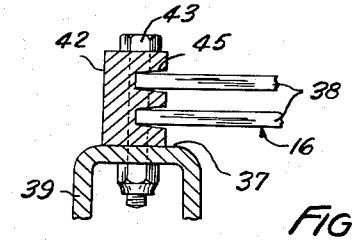
FIG. 8 is a sectional view taken through the anchorage means of FIG. 7 and as indicated by the section line 8—8 thereof.
Figure 7:
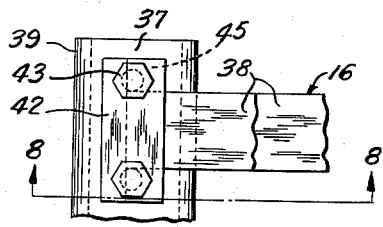
FIG. 7 is a fragmentary plan view showing anchorage means for an end portion of the torsion spring.

The end portions of the torsion spring 16 are anchored on the frame member 20 and, for this purpose, the frame member is provided at spaced points thereof with rigidly connected brackets 39 and 40 having mounting members or shackles 42 secured thereto by pairs of suitable attaching bolts 43 (see FIGS. 7 and 8). The brackets 39 and 40 are channel shaped members and are disposed so that the web portions thereof provide flat seating surfaces 37 against which the mounting members 42 are secured by the attaching bolts 43. The mounting members 42 are provided with transverse slots 45 which receive the ends of the spring blades 38. The attaching bolts 43 are spaced apart in the direction in which the slots 45 extend and the ends of the spring blades 38 are retained in the slots by being located between the paired bolts as shown in FIG. 7. By providing each of the mounting members with a pair of such slots 45, the end portions of two blades 38 can be maintained in a spaced-apart relation as shown in FIG. 8.

The lever portion or foot 14$^b$ of the upper suspension arm 14 provides a clamping portion extending in a transverse angular relation to the straight main arm portion 14$^a$ and which is secured to an intermediate portion 38$^a$ of the torsion spring 16 as by means of U-bolts 46. These bolts embrace the spring blades and carry securing nuts 46$^a$ which seat against the web portion 29 of the arm. The intermediate portions of the spring blades 38 are preferably also held in a clamped relation against each other by a clamping bolt 47 extending through such intermediate portions.

The flexible connection 17 provided for the inner end of the lower suspension arm 15 can be any conventional form of flexible connection suitable for this purpose and is here shown as comprising a pivot shaft 49 secured to the above-mentioned flat-plate securing portion 22 of the frame member 21 by suitable attaching bolts 50 and 51. The pivot shaft 49 is provided at opposite ends thereof with shaft portions 53 and 54 on which the fork arms 34 and 35 of the lower suspension arm 15 are pivotally mounted and are retained by means of the retaining nuts 55 and 56.

Figure 4:
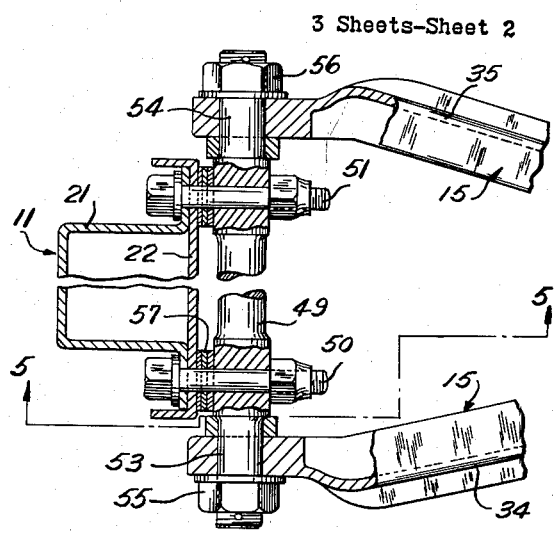
FIG. 4 is a fragmentary sectional view on a larger scale taken through the mechanism at the location of the inner end pivot means of the lower suspension arm and as indicated by the section line 4—4 of FIG. 5.
Figures 9, 10:
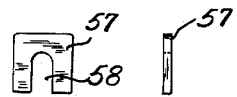
FIGS. 9 and 10 are plan and edge views respectively of an adjusting shim.

Adjustment of the operating position of the wheel 10 is readily obtained by the provision of suitable shims 57 between the pivot shaft 49 and the mounting surface 22 at the points of the clamping engagement provided by the attaching bolts 50 and 51 (see Fig. 4). As shown in FIGS. 9 and 10, the shims 57 are plate-like members of a forked shape and have slots 58 therein so that the shims can be readily inserted between the pivot shaft 49 and the mounting surface 22 in a straddling relation to the attaching bolts 50 and 51 by merely loosening the latter.

The operation of the wheel suspension 10 can be best described by referring to the diagrams of FIGS. 12, 13 and 14 which illustrate different conditions of the suspension corresponding with different operating positions of the wheel 12. FIG. 12 shows the wheel 12 in a normal running position on a substantially flat pavement 60, at which time the upper and lower suspension arms 14 and 15 are in a substantially horizontal and generally parallel relation.

FIG. 13 shows a wheel-up position of the wheel 12 such as would occur when the wheel is passing over a bump or relatively elevated portion of the pavement 60. At this time the upper and lower suspension arms 14 and 15 have swung to the upwardly and outwardly inclined relation shown in this view. The upward swinging of the lower arm 15 is a pivotal movement about the axis of the pivot shaft 49 and the upward swinging of the upper arm 14 has been accommodated by a torsional flexing of the spring blades 38 of the torsion spring 16.

FIG. 14 shows a wheel-down position of the wheel 12 such as would occur when the wheel has dropped into a hole or recess existing in the pavement 60. At this time the suspension arms 14 and 15 have swung to the downwardly and laterally inclined relation shown in this view, the swinging of the lower arm being by a pivotal movement about the axis of the pivot shaft 49 and the swinging of the upper arm being accommodated by a torsional flexing of the spring blades 38 in the opposite direction from that referred to in connection with FIG. 13.

Assuming that the positions shown in FIGS. 13 and 14 for the wheel 12 are representative of extreme operating conditions likely to be encountered and then comparing the corresponding relative positions of the upper suspension arm 14, it will be observed that the swinging displacements which have occurred for this arm relative to its normal operating position shown in FIG. 12 are approximately 30° angular displacements from such normal operating position. During these displacements of the arm 14, the torsion spring 16 is subjected to bending components or forces of magnitudes and directions represented by the lines 61 and 62 of the force diagrams of FIGS. 13 and 14. From the bending components 61 and 62 thus represented, it will be seen that an advantageous initial or normal position for the torsion spring 16 is an inclined position so that all or a substantial portion of the length of the spring then lies in an inclined plane which is inclined from the vertical by an angle of approximately 30°. This 30° inclined relation is the position in which the torsion spring 16 is shown in FIGS. 1 and 2 of the drawings.

In obtaining this inclined relation for the torsion spring 16, the brackets 39 and 40 of the anchorage devices for the torsion spring are secured to the frame member 20 so as to present their flat seating surfaces 37 in this angular relation. The lever portion 14$^b$ of the suspension arm 14 has a similar angular inclination, and accordingly, extends in a substantially parallel relation to the plane of the seating surfaces 37 of the brackets when this suspension arm is in its intermediate position corresponding with the normal running condition of the wheel 12. With the torsion spring 16 disposed in this inclined relation, it will be of maximum effectiveness in swingably connecting the arm 14 with the frame structure 11 in a manner to resist to best advantage the road shocks transmitted to the suspension by the wheel 12.

Figure 11:
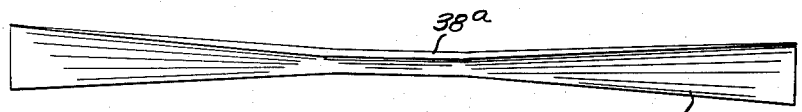
FIG. 11 is a plan view showing one of the torsion spring blades in a detached relation and unloaded condition.
Figure 6:
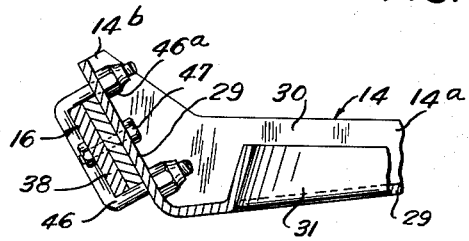
FIG. 6 is a fragmentary transverse vertical section taken through the intermediate portion of the torsion spring as indicated by section line 6—6 of FIG. 1.

The torsion spring 16 is preferably made with an initial twist therein, as shown in FIG. 11, so that when the spring is installed in the suspension 10 and is subjected to a normal or average load the spring will be subjected to an untwisting flexure by which the spring will be made to resume a condition in which the flat face of its end and intermediate portions will lie in one plane, namely, the 30° inclined plane mentioned above. An important advantage obtained from such a pretwisted condition of the torsion spring 16 is that the flat status of the spring under normal load will enable the spring to more effectively resist stresses imposed by the wheel 12, particularly binding stresses.

Another important advantage of the suspension 10 is that the use of the torsion spring 16 eliminates the need for a separate pivotal connection between the suspension arm 14 and the frame structure 11. The elimination of such a separate pivotal connection represents a simplification of the mechanism by a reduction in the number of parts. The cost of manufacture is thereby reduced, as well as the cost of servicing the vehicle with respect to lubrication and wear replacements for the pivotal connection which has been thus dispensed with.

The above-indicated advantage of quieter operation of the suspension 10, as compared with other forms of suspension, results primarily from two factors, namely, a flexible mounting for the upper suspension arm 14 and the application of the load of the wheel to the frame at a plurality of spaced points of the latter.

With respect to the flexible mounting for the upper suspension arm 14 it is pointed out that by having this arm supported on a spring member it enjoys a limited amount of flexibility in all directions. This flexibility for the arm 14 reduces the harshness of vibrations and shocks being transmitted from the road wheel 12 to the frame 11.

With respect to the spaced points of connection of the torsion spring 16 with the frame 11 it will be seen that since there are two such connections, one at each of the front and rear ends of the spring, the load transmitted to the frame at each of such spaced points will be relatively lighter and more readily absorbed than when the entire load is localized at a single location as in the case of the conventional coil spring being presently used.

Another feature of the present invention is the provision of check means in the wheel suspension 10 for limiting and cushioning the swinging movement of the suspension arms 14 and 15. This check means is here shown as comprising a bracket projection 64 on the frame member 20 and welded or otherwise rigidly connected therewith so as to extend toward the wheel 12 at a location between the suspension arms. One or more bumper members 65 of rubber or other yieldable cushioning medium are mounted on the bracket 64 on the underside thereof so as to be engageable by the web portion 32 of the lower suspension arm 15 for limiting and cushioning the upward swinging movement of the latter. One or more similar bumper elements 66 are mounted on the bracket 64 on the upper side thereof for engagement by web portion 29 of the upper suspension arm 14 for limiting and cushioning the downward swinging movement of the latter.

The checking and cushioning means of the wheel suspension 10 preferably also comprises a shock absorber 68 which is here shown as being of the direct-acting telescoping cylinder and piston type and which is operably connected between the bracket 64 and one of the suspension arms, in this case, the lower suspension arm 15. The shock absorber 68 is preferably double-acting and comprises a cylinder 69 having a resistance plunger (not shown) reciprocably operable therein and an actuating rod 70 connected with the plunger and projecting from the cylinder. The lower end of the cylinder 69 is suitably connected with the lower suspension arm 15, as by means of a conventional form of flexible connection 71 located in the opening 36 of the lower suspension arm.

To accommodate the shock absorber 68, the bracket 64 has an end recess 64ª in which the upper portion of the shock absorber cylinder 69 is received and also carries an extension bracket 73 of a suitable length and which extends upwardly through the clearance opening 31 of the upper suspension arm 14. The extension bracket 73 is rigidly mounted on the bracket 64, as by welding, and is of a hollow or channel-shaped form and has an angularly disposed upper end wall 74. The actuating rod 70 of the shock absorber 68 extends longitudinally within the recess of the extension bracket 73 and has its upper end attached to the end wall 74 by means of a conventional form of flexible connection 75.

From the arrangement and mounting of the shock absorber 68 as just described above, it will be seen that this shock absorber will cushionably resist swinging of the lower suspension arm 15 and of the wheel 12 and will effectively absorb road shocks encountered by the wheel. The shock absorber 68 also provides a safety connection between the wheel suspension 10 and the frame strutcture 11 because the attachment of the shock absorber to the bracket 64 and its relation to the suspension arms 14 and 15 will prevent the suspension arms from being torn loose from the frame structure in the event that the vehicle becomes involved in a collision or if the wheel 12 is otherwise subjected to an excessive impact force.

From the accompanying drawings and the foregoing detailed description it will now be readily understood that this invention has provided a wheel suspension of a novel form and which is of a simple and durable character and utilizes a torsion spring means to great advantage in the swingable connection of the suspension arm means with the frame structure of the vehicle. Since many of the advantages of this novel wheel suspension have already been pointed out above, they need not be here repeated.

Although different forms of the wheel suspension of the present invention have been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In a wheel suspension for a vehicle having a frame and a road wheel, a support member adapted to have said wheel rotatably mounted thereon, a laterally extending arm having said support member connected therewith, and means swingably connecting said arm with said frame comprising a flat torsion spring having end portions thereof anchored on said frame at spaced points of the latter and means securing said arm to an intermediate portion of said spring, said spring being disposed with the end portions thereof lying in a common plane, said spring having a preformed twist therein such that in the free state of the spring said intermediate portion lies in a plane which is inclined to said common plane by at least thirty degrees, said arm being swingable by twisting flexure of the spring which in response to normal loading of the arm is in opposition to said preformed twist, the normal load position of said arm being with said intermediate portion lying substantially in said common plane.

2. In wheel suspension mechanism for a vehicle having a frame and a road wheel, a pair of upper and lower suspension arms extending laterally relative to said frame, a wheel support member connected with said arms adjacent the outer ends thereof and having said wheel rotatably mounted thereon, pivot means pivotally connecting the inner end of the lower arm directly with said frame, a flat torsion spring extending along said frame, anchor means connecting opposite end portions of said spring with said frame, and clamping means rigidly connecting the inner end of the upper arm with the intermediate portion of said spring, said spring being disposed with the end portions thereof lying in a common plane, said spring having a preformed twist therein such that in the free state of the spring said intermediate portion lies in a plane which is inclined to said common plane by at least thirty degrees, said upper arm being swingable by twisting flexure of the spring which in response to normal loading of the said upper arm is in opposition to said preformed twist, the normal load position of said upper arm being with said intermediate portion lying substantially in said common plane.

3. In a wheel suspension for a vehicle having a frame and a road wheel, a wheel support member having said wheel rotatably mounted thereon, a suspension arm having its outer end flexibly connected with said support member, a flat torsion spring, means securing the other end of said arm to said spring at an intermediate portion of the length thereof, and anchor devices connecting the end portions of said spring to spaced portions of said frame and holding said end portions in a common plane having an upward and inward inclination of approximately thirty degrees from the vertical and away from said wheel, said spring having a preformed twist therein such that in the free state of the spring said intermediate portion lies in a plane which is inclined to said common plane by at least thirty degrees, said arm being swingable by twisting flexure of the spring which in response to normal loading of the arm is in opposition to said preformed twist, the normal load position of said arm being with said intermediate portion lying substantially in said common plane.

4. In a wheel suspension for a vehicle having a frame and a road wheel, a wheel support member having said wheel rotatably mounted thereon, a suspension arm having its outer end flexibly connected with said support member, a flat torsion spring, means securing the other end of said arm to said spring at an intermediate point of the length thereof, and anchor devices connecting the end portions of said spring to spaced portions of said frame, said anchor devices comprising blocks having transverse slots in which said end portions are engaged and pairs of attaching bolts securing said blocks to said spaced portions of the frame, said attaching bolts being spaced apart in a direction transverse to the longitudinal axis of the spring and having said end portions received therebetween for confining said end portions in said slots.

5. In a wheel suspension for a vehicle having a frame and a road wheel, spaced upper and lower suspension arms, a wheel support member having said wheel rotatably mounted thereon, flexible connections connecting said support member with the outer ends of said arms, means flexibly connecting the inner end of the lower arm with said frame, an elongated torsion spring, anchor devices connecting opposite end portions of said spring with said frame at spaced points of the latter, said upper arm having an angularly disposed inner end portion rigid therewith, means securing the angularly disposed inner end portion of the upper arm with the intermediate portion of said spring, a projection on said frame at a location between said arms, and a direct-acting shock absorber comprising relatively telescopingly movable housing and actuating members, one of the last mentioned members being connected with said projection and the other being connected with said lower arm.

6. In a wheel suspension for a vehicle having a frame and a road wheel, spaced upper and lower suspension arms, a wheel support member having said wheel rotatably mounted thereon, flexible connections connecting said support member with the outer ends of said arms, means flexibly connecting the inner end of the lower arm with said frame, an elongated flat torsion spring, anchor devices connecting opposite end portions of said spring with said frame at spaced points of the latter, said anchor devices holding said end portions of the spring in an inclined relation to the horizontal plane, said upper arm having an angularly disposed inner end portion rigid therewith, means securing the angularly disposed inner end portion of the upper arm with the intermediate portion of said spring, a projection on said frame and located between said arms, said upper arm having an opening therein, attaching means connected with said projection and extending into said opening, and a shock absorber comprising relatively telescopingly movable housing and actuating members, one of the last mentioned members being connected with said lower arm and the other extending into said opening and being connected with said attaching means.

7. In a wheel suspension for a vehicle having a frame and a steerable road wheel, a substantially L-shaped suspension arm projecting relative to said frame and comprising a normally horizontally extending stem portion and an angularly disposed base portion at the inner end of said stem portion and rigid with the latter, a support member pivotally connected with the outer end of said stem portion and having said wheel rotatably mounted thereon, a torsion spring having flat intermediate and end portions, means securing the flat end portions of said spring to said frame at spaced points of the latter and with said flat end portions lying in a common plane which is inclined in an upward and inward direction away from said wheel, and means securing said angularly disposed base portion of said arm to the flat intermediate portion of said spring, said spring having a preformed twist therein such that in the free state of the spring said intermediate portion lies in a plane which is inclined to said common plane by at least thirty degrees, said arm being swingable by twisting flexure of the spring which in response to normal loading of the arm is in opposition to said preformed twist, the normal load position of said arm being with said intermediate portion lying substantially in said common plane.

8. In a wheel suspension for a vehicle having a frame and a steerable road wheel, a suspension arm projecting relative to said frame and comprising a normally horizontally extending outer end portion and an angularly disposed inner end portion rigid therewith, a support member pivotally connected with said outer end portion and having said wheel rotatably mounted thereon, bracket members on said frame at spaced points thereof and having inclined clamping portions, a flat torsion spring having end portions thereof secured against said clamping portions, the intermediate portion of said spring having a preformed twist therein, and means securing said angularly disposed inner end portion of said arm to said intermediate portion of the spring, said spring being deflected under normal loading so that when said wheel is in normal running position said intermediate and end portions of said spring lie substantially in a common plane.

References Cited in the file of this patent

UNITED STATES PATENTS

| | | |
|---|---|---|
| 2,075,041 | Kliesrath | Mar. 30, 1937 |
| 2,096,115 | Leighton | Oct. 19, 1937 |
| 2,103,590 | Lefevre | Dec. 28, 1937 |
| 2,238,380 | Almen | Apr. 15, 1941 |
| 2,245,809 | Olley | June 17, 1941 |
| 2,596,922 | Thoms | May 13, 1952 |
| 2,635,894 | Jackman | Apr. 21, 1953 |
| 2,906,522 | Wagner | Sept. 29, 1959 |

FOREIGN PATENTS

| | | |
|---|---|---|
| 992,073 | France | June 27, 1951 |